United States Patent
Ueyama et al.

(10) Patent No.: US 11,376,736 B2
(45) Date of Patent: Jul. 5, 2022

(54) ACTIVITY AREA RESTRICTION METHOD, ROBOT CONTROL APPARATUS, AND NOTIFIER

(71) Applicant: HONDA MOTOR CO., LTD., Tokyo (JP)

(72) Inventors: Masaki Ueyama, Wako (JP); Anuraag Singh, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 170 days.

(21) Appl. No.: 16/821,743

(22) Filed: Mar. 17, 2020

(65) Prior Publication Data
US 2020/0306968 A1 Oct. 1, 2020

(30) Foreign Application Priority Data
Mar. 28, 2019 (JP) .............................. JP2019-064236

(51) Int. Cl.
*B25J 9/16* (2006.01)
(52) U.S. Cl.
CPC ........... *B25J 9/1666* (2013.01); *B25J 9/1676* (2013.01)
(58) Field of Classification Search
CPC ...... B25J 9/1664; B25J 9/1666; B25J 9/1676; B25J 9/1684; B25J 9/1697; G05B 2219/40202; G05B 2219/39388; G05B 2219/40442; G05B 2219/40424; G05B 2219/40425; G05B 2219/40203; G06K 19/06009–06178
See application file for complete search history.

(56) References Cited

FOREIGN PATENT DOCUMENTS

| JP | 2002-149240 | 5/2002 |
| JP | 2007-283450 | 11/2007 |
| JP | 2014-180725 A | 9/2014 |
| JP | 2015-55969 A | 3/2015 |
| JP | 2018-68885 A | 5/2018 |

OTHER PUBLICATIONS

Shirai et al., "Guiding a Robot by Visual Feedback in Assembling Tasks", 1973, Pattern Recognition Pergamon Press 1973. vol. 5, pp. 99-108 (Year: 1973).*
Japanese Office Action with English translation dated Jun. 8, 2021, 10 pages.
Japanese Office Action dated Dec. 1, 2020, 9 pages.

* cited by examiner

*Primary Examiner* — Spencer D Patton
(74) *Attorney, Agent, or Firm* — Rankin, Hill & Clark LLP

(57) ABSTRACT

An activity area restriction method for restricting an activity area of a robot includes: an area setting information acquisition step of acquiring area setting information notified by a notifier, the area setting information including a range of a predetermined restricted area with a height; an area restriction condition recognition step of recognizing the range of the restricted area, based on the area setting information; and an activity restriction step of restricting activity of the robot with respect to the restricted area.

10 Claims, 5 Drawing Sheets

ACTIVITY AREA RESTRICTION METHOD, ROBOT CONTROL APPARATUS, AND NOTIFIER

INCORPORATION BY REFERENCE

The present application claims priority under 35 U.S.C. § 119 to Japanese Patent Application No. 2019-064236 filed on Mar. 28, 2019. The content of the application is incorporated herein by reference in its entirety.

BACKGROUND OF THE INVENTION

Field of the Invention

The present invention relates to an activity area restriction method, a robot control apparatus, and a notifier.

Description of the Related Art

Conventionally, a daily living support robot has been known that observes an ambient environment by using a three-dimensional distance sensor and carries out work on behalf of a human (for example, see Japanese Patent Laid-Open No. 2007-283450). The daily living support robot reduces speed of an arm when the arm overlaps with an unobserved area where presence or absence of an obstacle is not yet observed by the three-dimensional distance sensor.

Moreover, a method has been proposed in which positions of an obstacle and a work place are visually notified to a mobile robot by setting landmarks that can be visually identified by the mobile robot in a work environment of the mobile robot (for example, see Japanese Patent Laid-Open No. 2002-149240).

Both the daily living support robot and the mobile robot recognize a position of a specific object such as an obstacle or a landmark and restrict an approach of the robot to the specific position. However, there are some cases where a user of the robot wishes to restrict activity of the robot not with respect to a specific position but with respect to an arbitrary three-dimensional area.

Aspects of the present invention are made in light of such a background, and an object of the present invention is to provide an activity area restriction method, a robot control apparatus, and a notifier that can easily set a three-dimensional area where activity of a robot is restricted.

SUMMARY OF THE INVENTION

A first aspect to achieve the above object can be an activity area restriction method for restricting an activity area of a robot, including: an area setting information acquisition step of acquiring area setting information notified by a notifier, the area setting information including a range of a predetermined restricted area with a height; an area restriction condition recognition step of recognizing the range of the restricted area, based on the area setting information; and an activity restriction step of restricting activity of the robot with respect to the restricted area.

In the activity area restriction method, the area setting information acquisition step may be configured such that the area setting information notified by the notifier is acquired, the notifier being arranged in a removable manner within a range where the robot is permitted to perform activity.

In the activity area restriction method, the area setting information acquisition step may be configured such that the area setting information notified by the notifier through display is acquired by recognition based on an image of the notifier captured by a camera.

In the activity area restriction method, when the area setting information acquired in the area setting information acquisition step includes a first height and a second height that is different from the first height, the area restriction condition recognition step may be configured such that a range from the first height to the second height is recognized as a height range of the restricted area.

In the activity area restriction method, when the area setting information acquired in the area setting information acquisition step includes a height and a depth, the area restriction condition recognition step may be configured such that the range of the restricted area is recognized based on the height and the depth.

In the activity area restriction method, the area setting information acquisition step may be configured such that the area setting information including an activity condition of the robot in the restricted area is acquired, the area restriction condition recognition step may be configured such that the activity condition is recognized based on the area setting information, and the activity restriction step may be configured such that the activity of the robot with respect to the restricted area is restricted based on the activity condition.

In the activity area restriction method, when the activity condition recognized in the area restriction condition recognition step includes information on a tool that is used by the robot and is permitted or forbidden to be used within the restricted area, the activity restriction step may be configured such that exit from the restricted area or entry into the restricted area of a whole or part of the robot in a state of carrying the tool is restricted.

A second aspect to achieve the above-mentioned object can be a robot control apparatus that controls operation of a robot, including: an area setting information acquisition section that acquires area setting information notified by a notifier, the area setting information including a range of a predetermined restricted area with a height; an area restriction condition recognition section that recognizes the range of the restricted area, based on the area setting information; and an activity restriction section that restricts activity of the robot with respect to the restricted area.

A third aspect to achieve the above-mentioned object can be a notifier including an area setting information display portion that displays, in a form that is visually recognizable to a robot, area setting information including a range of a predetermined restricted area with a height.

The area setting information display portion may be configured to display the area setting information including an activity condition of the robot with respect to the restricted area.

According to the activity area restriction method, area setting information notified by a notifier is acquired in the area setting information acquisition step, and based on the area setting information, a range of a restricted area is recognized in the area restriction condition recognition step. Then, activity of a robot with respect to the restricted area is restricted in the activity restriction step. Accordingly, a user of a robot can easily set an area where activity of the robot is restricted, through simple work of placing a notifier.

DETAILED DESCRIPTION OF THE PREFERRED EMBODIMENTS

1. Configurations of Robot and Robot Management Server

Figure 1:
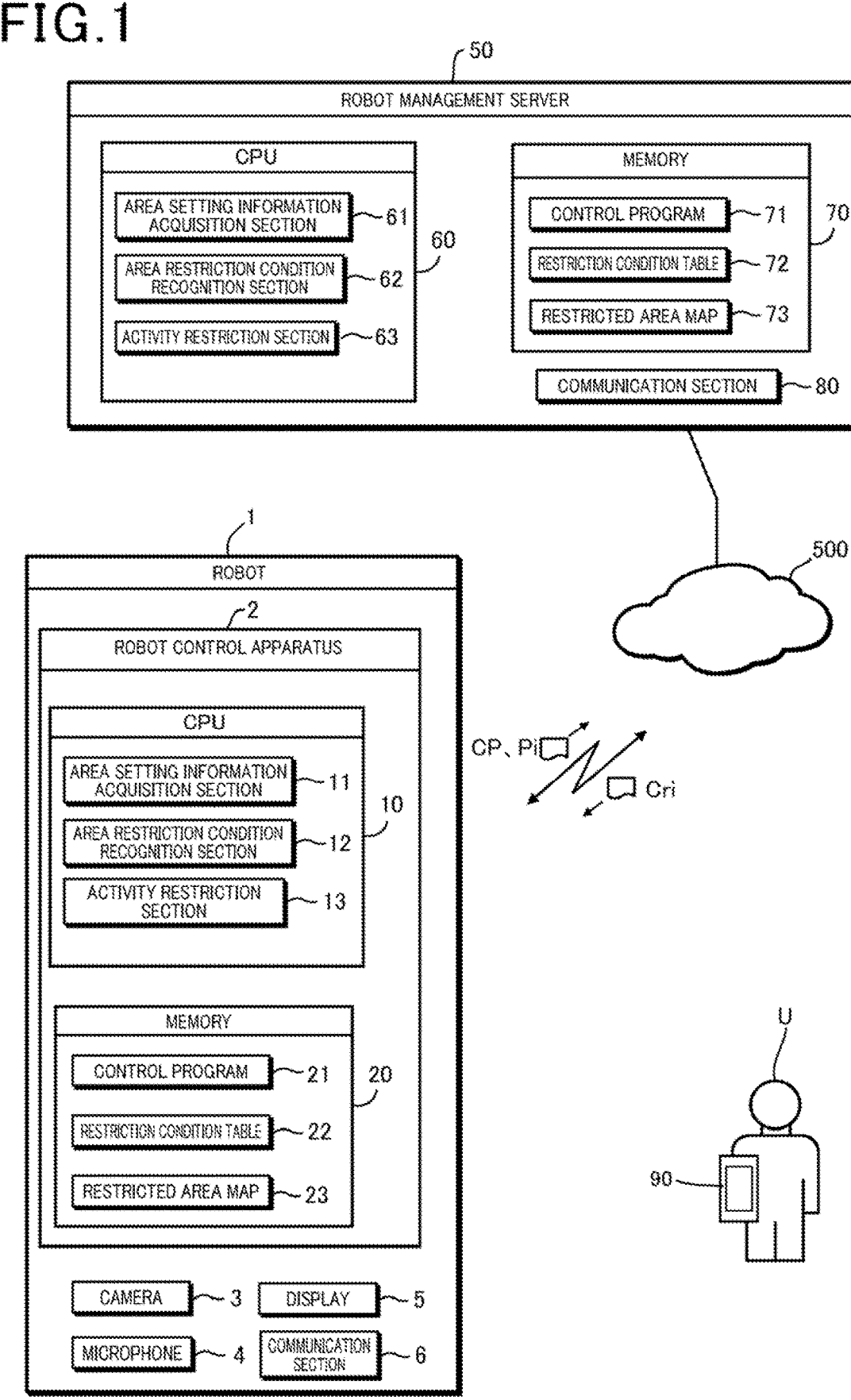
FIG. 1 is a diagram for describing configurations of a robot and a robot management server.
Figure 2:
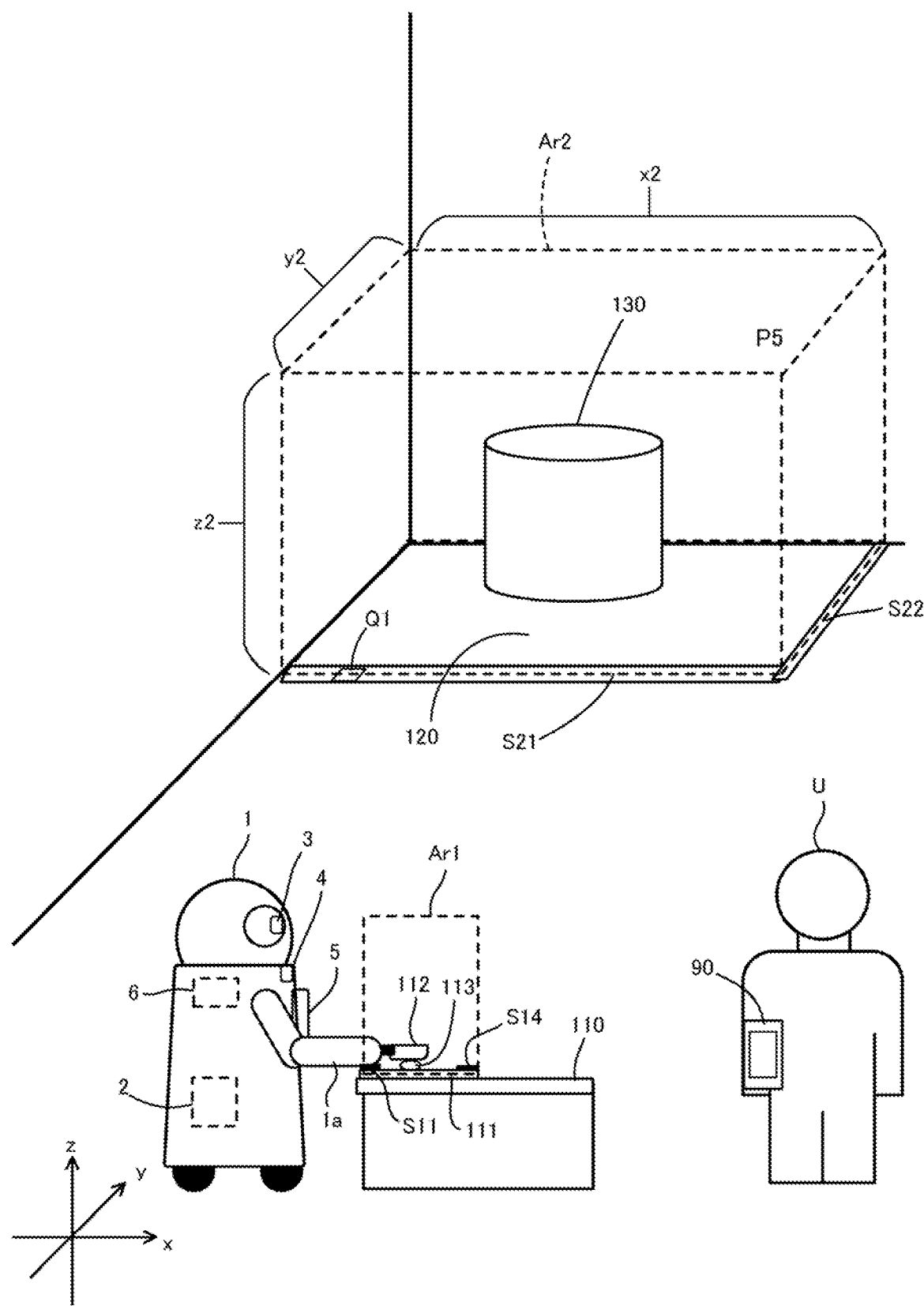
FIG. 2 is a diagram for describing an aspect of setting an area where an activity area of the robot is restricted.

A description will be given, with reference to FIGS. 1 and 2, of configurations of a robot 1 and a robot management server 50 that perform setting of a restricted area and restriction of activity with respect to the restricted area through an activity area restriction method of the present invention. As shown in FIGS. 1 and 2, the robot 1 is an autonomously traveling robot that moves in an area overlapping with an activity area of a user U and performs various work. FIG. 2 shows a situation where the robot 1 puts a to-be-cooked object 113 on a cutting board 111 placed on a cooking counter 110 and performs work of cutting with a kitchen knife 112.

In an embodiment, a restricted area that restricts an activity area of the robot 1 is set by an area setting seal (corresponding to a notifier of the present invention) stuck on a floor or the like by the user U, and FIG. 2 shows a situation where two restricted areas Ar1, Ar2 are set. The restricted area Ar1 is set by area setting seals S11, S12, S13, S14 (S12, S13 will be described later with reference to FIG. 4) stuck at four corners of the cutting board 111, respectively. The restricted area Ar2 is set by area setting seals S21, S22 stuck on a floor at a corner of a room.

The area setting seals S11, S12, S13, S14, S21, S22 have height information, and each of the restricted areas Ar1, Ar2 is therefore a cuboid area with a height. The area setting seals S11, S12, S13, S14, S21, S22 are stuck in a removable manner and arranged within a range where the robot 1 is permitted to perform activity. Details of setting of a restricted area will be describe later.

The robot 1 includes a robot control apparatus 2 that controls operation of the robot 1, a camera 3 that captures images of surroundings of the robot 1, a microphone 4 that collects sound around the robot 1, a display 5 that displays various information, and a communication section 6 for performing communication with a user terminal 90 used by the user U and the like. The camera 3 is a stereo camera, and the robot control apparatus 2 recognizes a real-space position of an object represented by coordinates in a three-dimensional x-y-z real space as shown in FIG. 2, based on a parallax by the stereo camera with a pair of right and left lenses.

The robot control apparatus 2 is an electronic circuit unit including a CPU (Central Processing Unit) 10, a memory 20, an interface circuit (not shown), and the like. The CPU 10 functions as an area setting information acquisition section 11, an area restriction condition recognition section 12, and an activity restriction section 13 by executing a control program 21 for controlling the robot 1 stored in the memory 20.

The area setting information acquisition section 11 extracts an image portion of each area setting seal from an image captured by the camera 3, and acquires area setting information indicated by the area setting seals. Based on the area setting information acquired by the area setting information acquisition section 11, the area restriction condition recognition section 12 recognizes boundary information indicating a range of a restricted area, and work information indicating an activity condition of the robot 1 in the restricted area. Based on the boundary information and the work information recognized by the area restriction condition recognition section 12, the activity restriction section 13 restricts activity of the robot 1 in the restricted area.

The memory 20 stores, in addition to the control program 21, a restriction condition table 22 in which the area setting information notified by the area setting seals is associated with the boundary information and the work information on the restricted area. Moreover, the memory 20 stores a restricted area map 23 in which a position of each restricted area recognized by the robot 1, which is represented by coordinates in the three-dimensional real space, is registered.

A configuration may be made such that processing of acquiring the area setting information, processing of recognizing the boundary information and the work information on each restricted area, and processing of restricting activity of the robot 1 in each restricted area are performed not by the robot control apparatus 2 but by the robot management server 50 that performs communication with the robot 1 through a communication network 500. The robot management server 50 is a computer system including a CPU 60, a memory 70, and the like. The CPU 60 functions as an area setting information acquisition section 61, an area restriction condition recognition section 62, and an activity restriction section 63 by executing a control program 71 for controlling the robot management server 50 stored in the memory 70. The memory 70 stores a restriction condition table 72 and a restricted area map 73, similarly to the memory 20.

Functions of the area setting information acquisition section 61, the area restriction condition recognition section 62, and the activity restriction section 63 are similar to the above-described functions of the area setting information acquisition section 11, the area restriction condition recognition section 12, and the activity restriction section 13 of the robot control apparatus 2, respectively. However, the area setting information acquisition section 61 acquires an image Pi captured by the camera 3 of the robot 1 by receiving from the robot 1, and extracts an image portion of each area setting seal from the acquired image. The activity restriction section 63 recognizes a current position of the robot 1 in real time by receiving current position information on the robot 1 transmitted from the robot 1. The activity restriction section 63 transmits, to the robot 1, activity restriction instruction information Cri that instructs the robot 1 to restrict activity in a restricted area.

In the case of using the robot management server 50 as described above, although the image captured by the camera 3 and the current position information on the robot 1 need to be transmitted and received between the robot 1 and the robot management server 50, others are similar to the case of using the robot control apparatus 2. Accordingly, a description below will be given of a case where processing of setting a restricted area and restricting activity of the robot 1 is performed by the robot control apparatus 2.

Here, processing performed by the area setting information acquisition section 11 or the area setting information acquisition section 61 corresponds to an area setting information acquisition step in the activity area restriction method of the present invention. Processing performed by the area restriction condition recognition section 12 or the area restriction condition recognition section 62 corresponds to an area restriction condition recognition step in the activity area restriction method of the present invention. Processing performed by the activity restriction section 13 or the activity restriction section 63 corresponds to an activity restriction step in the activity area restriction method of the present invention.

Figure 3:
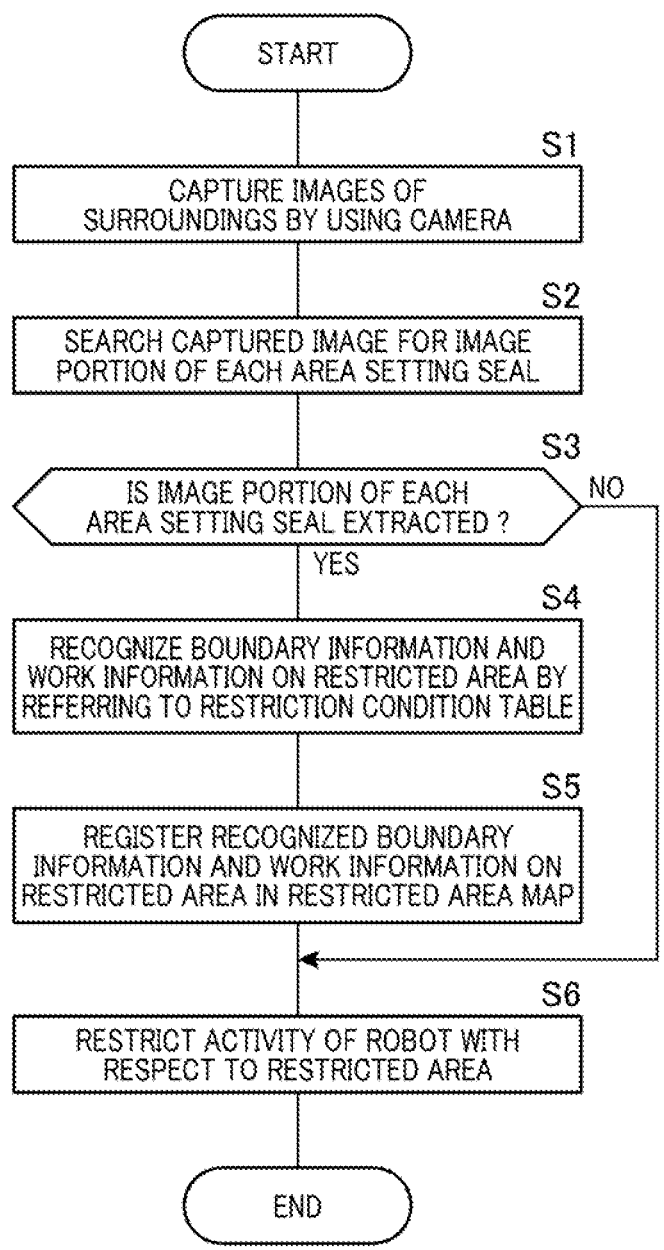
FIG. 3 is a flowchart of processing of setting restricted areas and restricting activity of the robot with respect to the restricted areas.

2. Processing of Recognizing Restriction Condition for Restricted Area and Restricting Activity of Robot A series of processing performed by the robot control apparatus 2 in the situation shown in FIG. 2 will be described by following a flowchart shown in FIG. 3. Steps S1 to S3 in FIG. 3 are processing by the area setting information acquisition section 11. In step S1, the area setting information acquisition section 11 uses the camera 3 to capture images of surroundings of the robot 1, and searches a captured image for an image portion of each area setting seal. The portion of each area setting seal recognized from the captured image corresponds to an area setting information display portion that displays area setting information in a form that is visually recognizable to the robot in the present invention.

In subsequent step S2, the area setting information acquisition section 11 advances the processing to step S4 when the image portions of the area setting seals are extracted from the captured image, and advances the processing to step S6 when the image portions of the area setting seals are not extracted from the captured image. Steps S4 to S5 are processing by the area restriction condition recognition section 12.

In step S4, the area restriction condition recognition section 12 recognizes boundary information and work information on each restricted area according to the area setting seals of which the image portions are extracted in step S3, by referring to the restriction condition table 22. The boundary information may be defined by a single area setting seal in some cases, and may be defined by a plurality of area setting seals in some cases.

For example, regarding the boundary information on the restricted area Ar2 in FIG. 2, the restricted area Ar2 is set by the two area setting seals S21, S22 in such a manner that a length in an x direction (width direction) is defined by a length x2 of the area setting seal S21, a length in a y direction (depth direction) is defined by a length y2 of the area setting seal S22, and a length in a z direction (height direction) is defined by a mark Q1 added to the area setting seal S21. The mark Q1 may directly indicate the length (height) in the z direction by using a number, or may be a recording code such as a QR code (R) or a bar code. Alternatively, the length in the z direction may be specified by a difference in color between the area setting seals S21 and S22. The mark Q1 may be drawn by the user U on the area setting seal S21.

The work information on the restricted area Ar2 is also indicated by the mark Q1. The work information includes, for example, following a to f.

a: Forbid entry into the restricted area.
b: Forbid exit from the restricted area.
c: Permit predetermined work only within the restricted area.
d: Permit work using a predetermined tool only within the restricted area, and forbid exit from the restricted area with the predetermined tool carried.
e: Permit predetermined work only outside the restricted area.
f: Permit work using a predetermined tool only outside the restricted area, and forbid entry into the restricted area with the predetermined tool carried.

The mark Q1 includes a display indicating the above a: "Forbid entry into the restricted area", and thus prevents the robot 1 from entering the restricted area Ar2 and making contact with a protected object 130.

Figure 4:
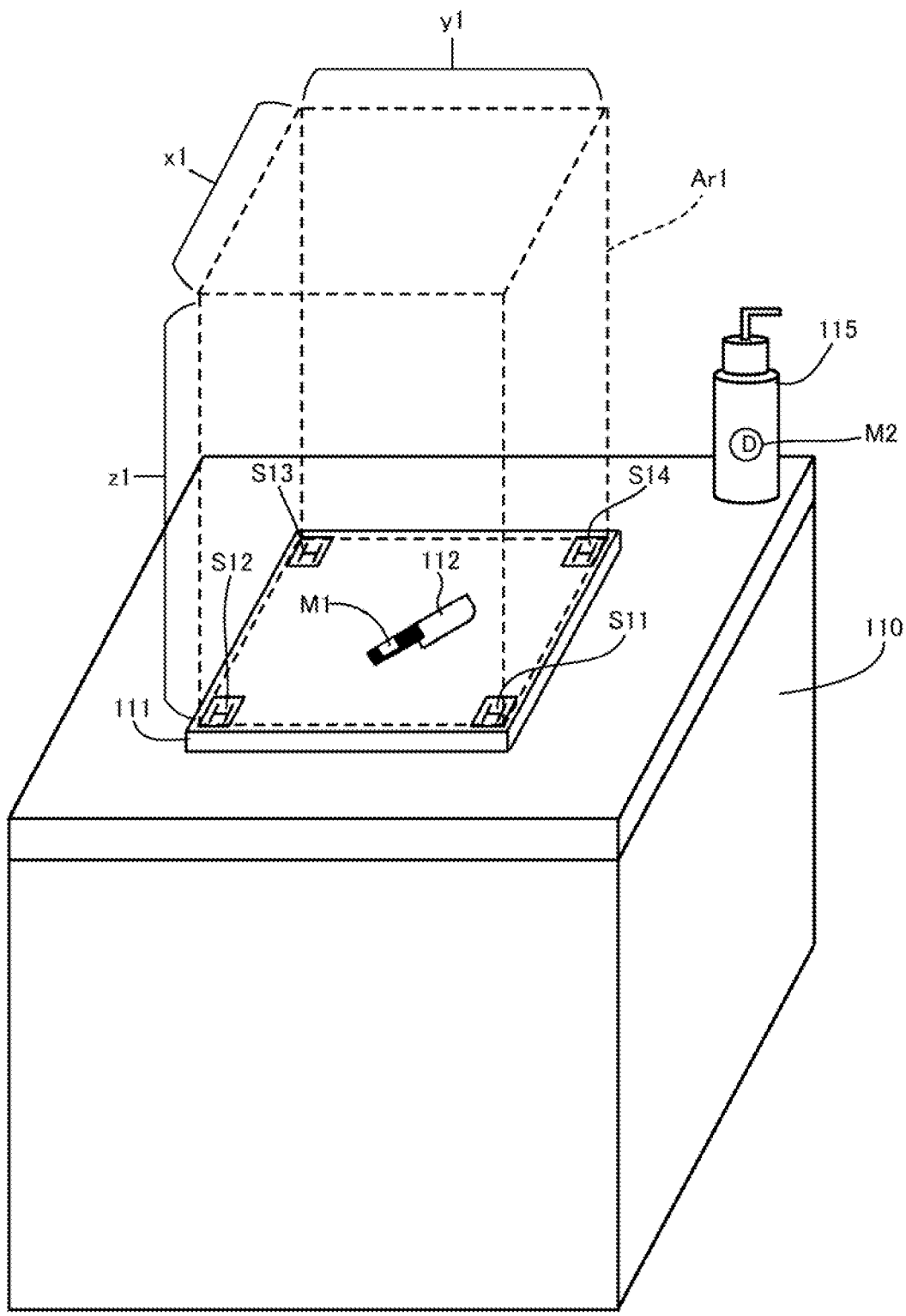
FIG. 4 is a diagram for describing an example in which a restricted area is set on a cooking counter.

As shown in FIG. 4, the restricted area Ar1 is set by the area setting seals S11, S12, S13, S14 stuck at the four corners of the cutting board 111 placed on the cooking counter 110 in such a manner that a length in the x direction is defined by an interval x1 between the area setting seals S12 and S13, a length in the y direction is defined by an interval y1 between the area setting seals S13 and S14, and a length in the z direction is defined by a length z1 specified by an "H" mark shown on any of the area setting seals S11, S12, S13, S14. The length specified by the "H" mark is recorded in the restriction condition table 22.

Moreover, the "H" mark indicates work information that permits work using the kitchen knife 112 only within the restricted area Ar1, and a use restriction mark M1 indicating that use is permitted only within the restricted area Ar1 is attached to the kitchen knife 112. Furthermore, the "H" mark indicates work information that forbids use of an insecticide spray 115 within the restricted area Ar1, and a use restriction mark M2 indicating that use within the restricted area Ar1 is forbidden is attached to the insecticide spray 115.

With respect to the restricted area Ar1, the activity restriction section 13 permits use of the kitchen knife 112 to which the use restriction mark M1 is attached only within the restricted area Ar1, and forbids the robot 1 in a state of carrying the kitchen knife 112 to exit from the restricted area Ar1. Moreover, with respect to the restricted area Ar1, the activity restriction section 13 forbids use of the insecticide spray 115 to which the use restriction mark M2 is attached within the restricted area Ar1. Note that the kitchen knife 112 and the insecticide spray 115 may be recognized not by using the use restriction marks M1, M2 but by shape recognition of image portions of the kitchen knife 112 and the insecticide spray 115.

Figure 5:
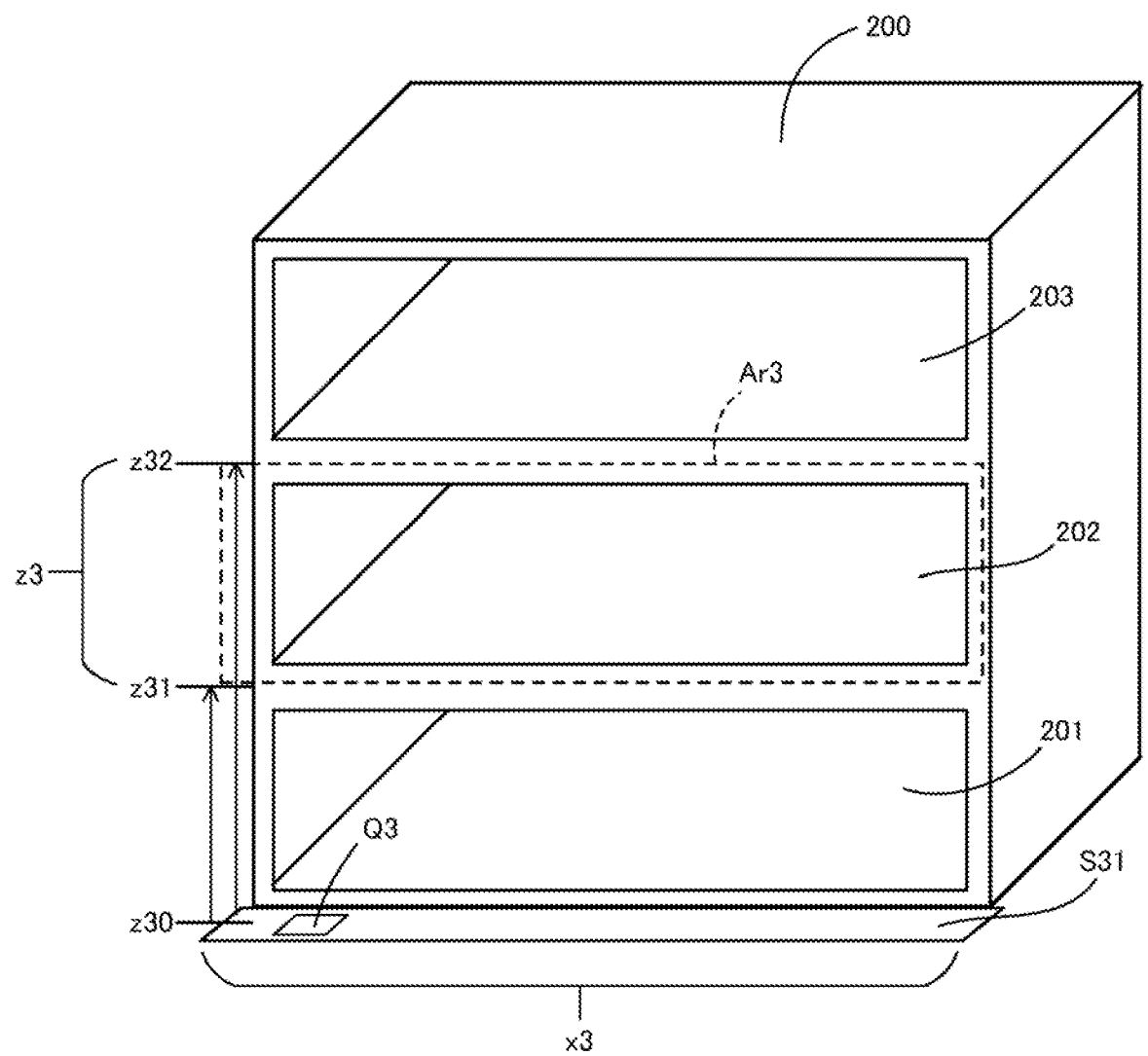
FIG. 5 is a diagram for describing an example in which a restricted area is set on part of a multiple-tier shelving unit.

FIG. 5 illustrates a case where a restricted area Ar3 is set in such a manner that a range extending away from an area setting seal in the z direction is specified by one area setting seal S31. In FIG. 5, regarding a three-tier shelving unit 200 including a top shelf 201, a middle shelf 202, and a bottom shelf 203, the restricted area Ar3, which is a virtual wall, is set on a front face of the middle shelf 202 by the area setting seal S31 in order to forbid entry of an arm 1a of the robot 1 into the middle shelf 202.

A mark Q3 indicating information on a first height z31 and a second height z32 is attached to the area setting seal S31, and the area restriction condition recognition section 12 recognizes a range from the first height z31 to the second height z32 as a range of the restricted area Ar3 in the z direction. Moreover, the mark Q3 indicates work information that forbids entry from a front-face side of the three-tier shelving unit 200 into the middle shelf 202 beyond the restricted area Ar3. Accordingly, the activity restriction section 13 forbids the arm 1a of the robot 1 to go beyond the restricted area Ar3 from the front-face side of the three-tier shelving unit 200 and enter an inner space of the middle shelf 202.

Referring back to the flowchart in FIG. 3, in step S5, the area restriction condition recognition section 12 registers the recognized boundary information and work information on each restricted area in the restricted area map 23 in a form of code information as follows:

Code information=(x1,x2,y1,y2,z1,z2,Wcd)

where x1, x2 represent a range of the x coordinate, y1, y2 represent a range of the y coordinate, z1, z2 represent a range of the z coordinate, and Wcd is the work information.

Subsequent step S6 is processing by the activity restriction section 13, in which the activity restriction section 13 recognizes a range of each restricted area by referring to the restricted area map 23, and restricts activity of the robot 1 with respect to the restricted area, in accordance with an activity condition set by the work information. In the example in FIG. 2, the activity restriction section 13 restricts entry of the robot 1 into the restricted area Ar2. Moreover, the activity restriction section 13 permits the robot 1 to do work of cooking using the kitchen knife 112 only within the restricted area Ar1, and forbids the robot 1 carrying the kitchen knife 112 to exit from the restricted area Ar1.

3. Other Embodiments

In the above-described embodiment, after the boundary information and the work information on each restricted area set by the area setting seals are registered in the restricted area map 23, the restriction of activity of the robot 1 may be continued based on the registered boundary information and work information even if the user removes the area setting seals. Thus, since an area setting seal needs to be stuck only when a restricted area is set, disfigurement of a room caused by sticking an area setting seal can be avoided.

In such a case, the restriction on a range of activity by a restricted area can be removed by passage of a predetermined time period of the setting, or by allowing the robot 1 to recognize a mark indicating derestriction. The restriction on a range of activity by a restricted area may also be removed by operating the user terminal 90.

Although an area setting seal that notifies setting information on a restricted area through display is illustrated as a notifier of the present invention in the above-described embodiment, a notifier that notifies setting information on a restricted area by using a wireless signal (a signal by means of radio waves, light, sound, or the like) may be used. For example, a configuration can be adopted in which setting information on a restricted area is transmitted to the robot 1 through RFID (Radio Frequency Identifier) wireless communication.

Although the camera 3 of the robot 1 is provided at a head part of the robot 1 in the above-described embodiment, the camera 3 may be provided at another part such as a distal end part of the arm 1a of the robot 1. Although a stereo camera is used for the camera 3, a monocular camera may be used. When a monocular camera is used, a real-space position of an object can be recognized based on a parallax and a distance of movement of an image portion between images captured at two positions by moving the head part of the robot 1 to right and left and capturing images at the two positions.

Although an example of sticking the area setting seals on the floor or the cutting board is illustrated in the above-described embodiment, an area setting seal only needs to be stuck at a place that can be captured by the camera 3 of the robot 1. For example, by sticking an area setting seal on a ceiling, the area setting seal can be prevented from being hidden behind an article placed on the floor.

Although an area setting seal is illustrated as a notifier of the present invention in the above-described embodiment, a tape or the like without adhesive property may be used. A mark or a code indicating boundary information and work information may be shown on the notifier in advance, or may be freely added by a user. By making notifiers on each of which a mark or a code indicating boundary information and work information is shown in advance commercially available, a user can easily set a range of a restricted area and a content of restriction by purchasing and using a notifier to which a desired area setting condition is attached.

Although the autonomously traveling robot 1 is illustrated in the above-described embodiment, the present invention can also be applied to a fixed robot such as a robot performing assembly work in a factory. In a case of the fixed robot, an embodiment is made such that entry into a restricted area or exit from a restricted area of not the whole robot but part of the robot, such as an arm holding an engineering tool, is restricted.

Note that FIG. 1 is a schematic diagram illustrating functional components of the robot 1 and the robot management server 50 that are divided by main content of processing in order to facilitate understanding of the invention of the present application, and the components of the robot 1 and the robot management server 50 may be configured based on other divisions. Processing by each constitutional element may be performed by a single hardware unit, or may be performed by a plurality of hardware units. The processing by each constitutional element illustrated in FIG. 1 may be performed by a single program, or may be performed by a plurality of programs.

REFERENCE SIGNS LIST

1 . . . Robot, 2 . . . Robot control apparatus, 3 . . . Camera, 4 . . . Microphone, 5 . . . Display, 6 . . . Communication section, 10 . . . CPU, 11 . . . Area setting information acquisition section, 12 . . . Area restriction condition recognition section, 13 . . . Activity restriction section, 20 . . . Memory, 21 . . . Control program, 22 . . . Restriction condition table, 23 . . . Restricted area map, 50 . . . Robot management server, 60 . . . CPU, 61 . . . Area setting information acquisition section, 62 . . . Area restriction condition recognition section, 63 . . . Activity restriction section, 70 . . . Memory, 71 . . . Control program, 72 . . . Restriction condition table, 73 . . . Restricted area map, 80 . . . Communication section, 90 . . . User terminal, Ar1, Ar2, Ar3 . . . Restricted area, S11, S12, S13, S14, S21, S22, S31 . . . Area setting seal (notifier), Q1, Q3 . . . Mark, U . . . User

What is claimed is:

1. An activity area restriction method for restricting an activity area of a robot, comprising:
    an area setting information acquisition step of acquiring area setting information indicated by a notifier, the area setting information including a range of a predetermined restricted area with a height;
    an area restriction condition recognition step of recognizing the range of the restricted area, based on the area setting information;
    a step of storing, in a memory, information of the range of the restricted area which is recognized in the area restriction condition recognition step; and
    an activity restriction step of restricting activity of the robot with respect to the restricted area,
    wherein the activity restriction step includes
        restricting the activity of the robot with respect to the restricted area based on the information of the range of the restricted area stored in the memory even after the notifier is removed, and removing restriction of the activity of the robot by the restricted area when recognizing a mark indicating derestriction.

2. The activity area restriction method according to claim 1, wherein in the area setting information acquisition step, the area setting information indicated by the notifier is acquired, the notifier being arranged in a removable manner within a range where the robot is permitted to perform activity.

3. The activity area restriction method according to claim 1, wherein when the area setting information acquired in the area setting information acquisition step includes a first height and a second height that is different from the first height,
in the area restriction condition recognition step, a range from the first height to the second height is recognized as a height range of the restricted area.

4. The activity area restriction method according to claim 1, wherein when the area setting information acquired in the area setting information acquisition step includes a height and a depth,
in the area restriction condition recognition step, the range of the restricted area is recognized based on the height and the depth.

5. The activity area restriction method according to claim 1, wherein in the area setting information acquisition step, the area setting information including an activity condition of the robot in the restricted area is acquired,
in the area restriction condition recognition step, the activity condition is recognized based on the area setting information, and
in the activity restriction step, the activity of the robot with respect to the restricted area is restricted based on the activity condition.

6. The activity area restriction method according to claim 5, wherein when the activity condition recognized in the area restriction condition recognition step includes information on a tool that is used by the robot and is permitted or forbidden to be used within the restricted area,
in the activity restriction step, exit from the restricted area or entry into the restricted area of a whole or part of the robot in a state of carrying the tool is restricted.

7. The activity area restriction method according to claim 1, wherein in the area setting information acquisition step, regarding the notifier to which an information indication is added, acquiring the area setting information which includes the range of the predetermined restricted area with the height by recognizing the information indication.

8. The activity area restriction method according to claim 7, wherein in the area setting information acquisition step, the area setting information indicated by the information indication of the notifier is acquired by recognition based on an image of the notifier captured by a camera.

9. A robot control apparatus that controls operation of a robot, comprising a CPU that includes:
an area setting information acquisition section that acquires area setting information indicated by a notifier, the area setting information including a range of a predetermined restricted area with a height;
an area restriction condition recognition section that recognizes the range of the restricted area, based on the area setting information; and
an activity restriction section that restricts activity of the robot with respect to the restricted area,
wherein the area restriction condition recognition section stores, in a memory, information of the range of the restricted area,
the activity restriction section
restricts the activity of the robot with respect to the restricted area based on the information of the range of the restricted area stored in the memory even after the notifier is removed, and
removes restriction of the activity of the robot by the restricted area when recognizing a mark indicating derestriction.

10. The robot control apparatus according to claim 9, wherein the area setting information acquisition section, regarding the notifier to which an information indication is added, acquires the area setting information which includes the range of the predetermined restricted area with the height by recognizing the information indication.

* * * * *